United States Patent [19]
Watson

[11] Patent Number: 6,149,855
[45] Date of Patent: *Nov. 21, 2000

[54] METHOD OF MANUFACTURING A BUILDING MATERIAL FROM VOLCANIC MAGMA

[76] Inventor: Louis L. Watson, 1708 Ferndale Cir., West Sacramento, Calif. 95691

[*] Notice: This patent issued on a continued prosecution application filed under 37 CFR 1.53(d), and is subject to the twenty year patent term provisions of 35 U.S.C. 154(a)(2).

[21] Appl. No.: 08/281,520

[22] Filed: Jul. 28, 1994

[51] Int. Cl.[7] .......................... C04B 35/653; B28B 7/10

[52] U.S. Cl. ........................ 264/334; 264/31; 264/33; 264/299; 264/332

[58] Field of Search .................... 264/332, 31, 33, 264/299, 334

[56] References Cited

PUBLICATIONS

JP Abstract 04–203026 (Corresp. to App No. 02–334437) Abstract Published Nov. 1992.
J.D. Griggs, U.S. Geological survey, Apr. 1989.

*Primary Examiner*—Christopher A. Fiorilla
*Attorney, Agent, or Firm*—John P. O'Banion

[57] ABSTRACT

A method of manufacturing a building material includes the steps of directing molten volcanic magma from an underwater volcanic magma vent to a level above sea level via a tube formed from the magma; directing the molten volcanic magma into a mold on a floating barge; cooling the magma in the mold to form a building material; and removing the building material from the mold. The tube is formed by lowering a cap assembly over an underwater flowing volcanic magma vent and raising the cap such that the magam solidifies inside the cap perimeter where it is cold.

1 Claim, 5 Drawing Sheets

METHOD OF MANUFACTURING A BUILDING MATERIAL FROM VOLCANIC MAGMA

BACKGROUND OF THE INVENTION

1. Field of the Invention

The present invention pertains generally to building materials and their method of manufacture, and more particularly to using flowing volcanic magma to make structures and material that is ordinarily made of wood, brick, stone, steel, concrete, glass and other materials, as well as to generate electricity.

2. Description of the Background Art

In the past, structures have been made of wood, brick, stone, concrete, steel glass, plastic and other materials. Electricity has been generated by the use of geothermal, sun, nuclear and fossil fuel heat sources. Flowing volcanic magma is not known to have been used to produce building materials or electricity.

The main disadvantage of the prior materials and heat sources is the high cost to produce the raw materials, the refining costs plus transportation to manufacturing site. Geothermal heat depletes, the sun doesn't always shine, and nuclear plants have a special safety requirement cost.

Volcanic magma has been flowing almost continuously somewhere in the world from earliest times and will continue to do so for millennia to come. It is uncontrollable: nothing can stop it from erupting through the earth's surface. It has been useless at best and terribly destructive to life and property at its worst.

Therefore, there is a need for a method to tap flowing volcanic magma at low cost and to utilize this natural resource to produce many things, including electricity. The present invention satisfies that need, as well as others.

SUMMARY OF THE INVENTION

In accordance with the present invention, flowing volcanic magma is directed into molds or machinery in the fluid state to produce barges, wharves, breakwaters, fences, sound barriers, road paving, pipe, floors, walls, roofs, building block, structural foam, batt insulation, insulating board and fiber strand reinforcement for plastics, as well as used as a heat source for the generation of electricity.

A main advantage of this invention is that many products can now be made with little or no material cost.

Another advantage of this invention is that magma is stronger and more resistant to chemical attack than concrete.

An important advantage of this invention is that it can be used to generate electricity at very low cost.

BRIEF DESCRIPTION OF THE DRAWINGS

The invention will be more fully understood by reference to the following drawings which are for illustrative purposes only, and where like reference numbers denote like parts.

DESCRIPTION OF PREFERRED EMBODIMENTS

Referring more specifically to the drawings, for illustrative purposes the present invention is embodied in the apparatus generally shown in FIG. 1 through FIG. 12. It will be appreciated that the apparatus may vary as to configuration and as to details of the parts, and that the method may vary as to the specific steps and sequence, without departing from the basic concepts as disclosed herein.

Figure 1:
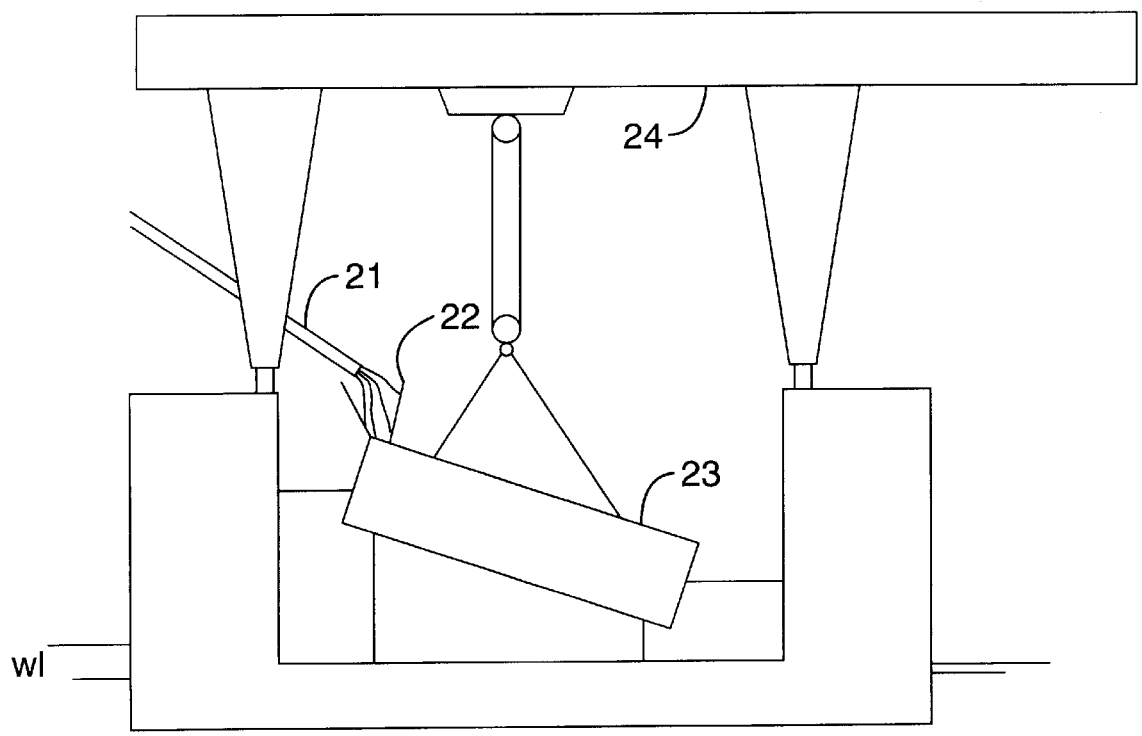
FIG. 1 is a cross-sectional view of a magma casting facility according to the present invention.

FIG. 1 shows a flowing volcanic magma casting facility in cross-section. Flowing volcanic magma is gated down an insulated delivery tube 21 to trough 22 which is continuous along the top corner of ganged, inclined slab molds 23. Molds 23 have water filled, hollow steel spacers between the faces of the slabs (not shown) to keep the steel from getting too hot and generate steam for additional use at the same time. Overhead traveling crane 24 inserts reinforcing, shuttering; helps close the molds; helps direct delivery tube 21; opens molds and removes the precast units to storage.

Figure 2:
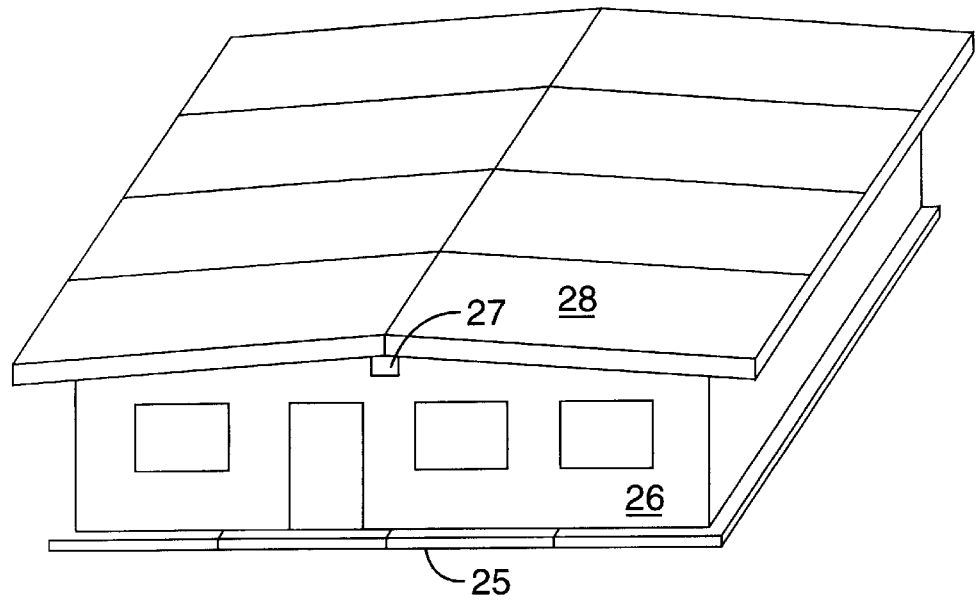
FIG. 2 shows a perspective view of a dwelling constructed of precast parts made in the casting facility shown in FIG. 1.
Figure 3:
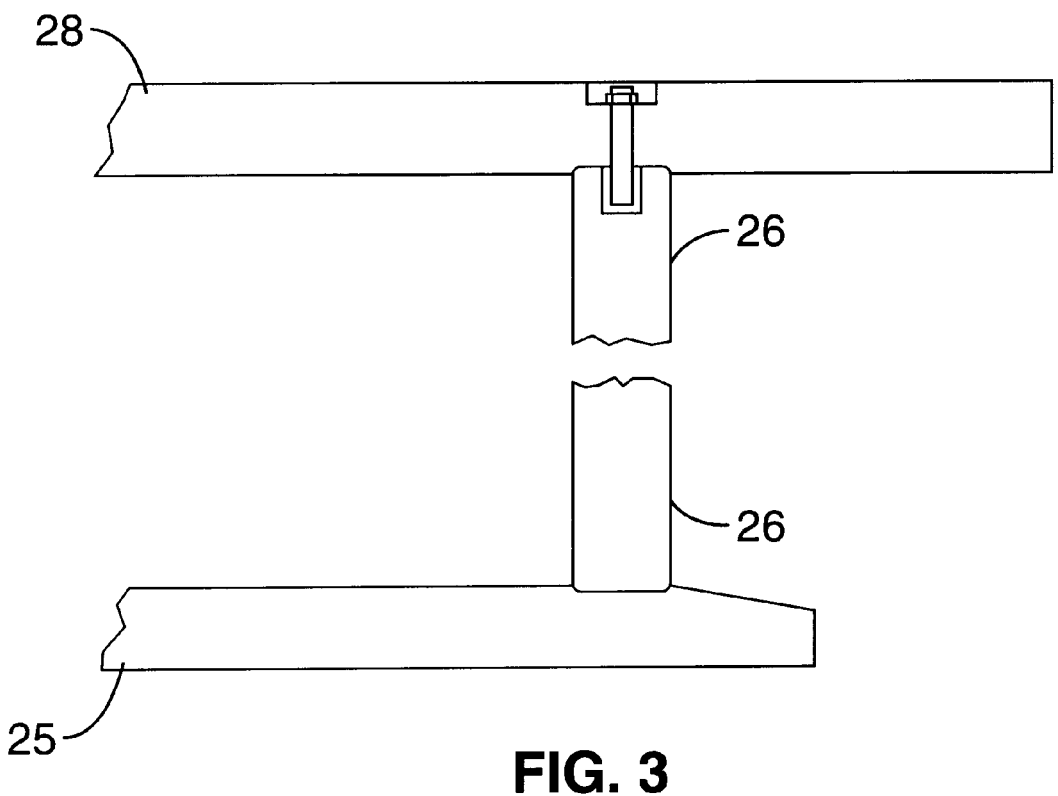
FIGS. 3 and 4 show cross-sectional views of the joints and fastenings in the dwelling shown in FIG. 2.
Figure 4:
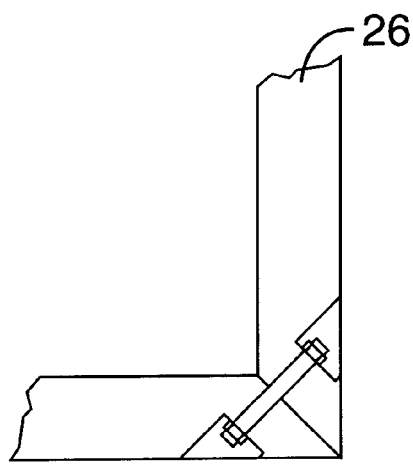

FIG. 2 shows a perspective view of a dwelling constructed of precast panels made in the casting facility FIG. 1. It is assembled from four floor slabs 25; five wall slabs 26, one beam 27 and eight roof slabs 28. They are bolted at the joints as shown in FIGS. 3 and 4.

Figure 5:
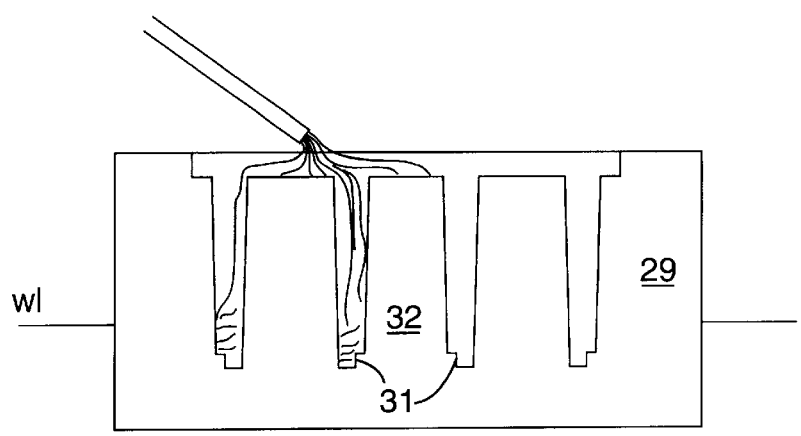
FIGS. 5 through 8 show a sequence in cross-section of a barge construction method according to the invention.

FIG. 5 shows a cross section of a floating mold 29 that defines the deck 30, sides 31 and ends (not shown) that is being filled with flowing volcanic magma. Reference number 32 indicates bulkheads (longitudinal and transverse).

Figure 6:
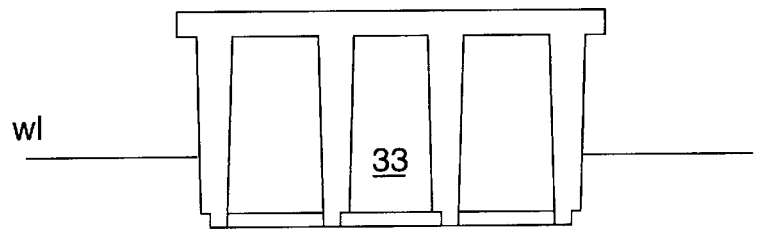

FIG. 6 shows a cross-sectional view of the part 33 just cast in FIG. 5. It is supported by trapped air.

Figure 7:
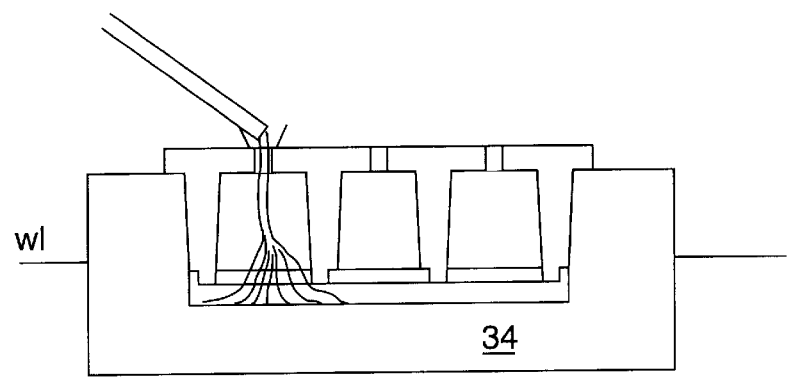

FIG. 7 shows a cross-sectional view of a drydock 34 supporting part 33 by the deck overhang so that its skirts are above the floor of the drydock 34 and will be engaged by the closing pour.

Figure 8:
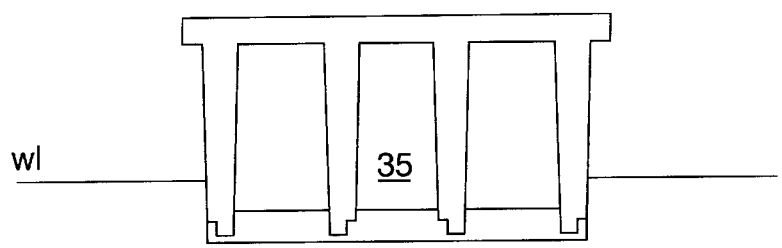

FIG. 8 shows the completed barge 35 floated out of the drydock 34.

Figure 9:
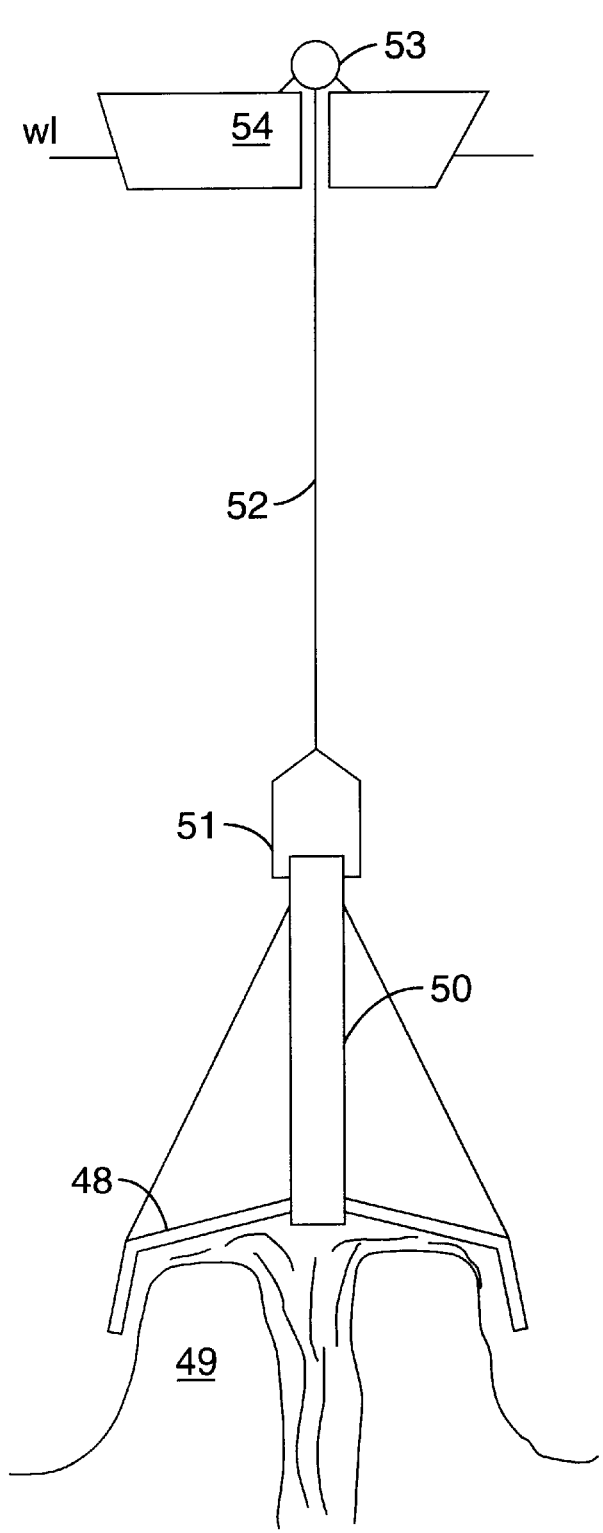
FIG. 9 is a cross-sectional view showing a method of building a giant lava chimney over an underwater vent according to the invention.

FIG. 9 is a cross-sectional view showing a method of building a giant lava tube to the ocean surface and above from an underwater flowing volcanic magma vent. A steel slip form cap assembly 48 is lowered over the flowing volcanic magma vent 49. The diameter of 48 is a function of the flowing volcanic magma flow rate and cooling rate. The flowing volcanic magma raises the cap and solidifies inside the perimeter where it is cold. The direction of growth can be changed by pulling up and sideways on riser 50 by use of the cable 52, its winch 53 and using thrusters or anchors on vessel 54. Flotation chamber 51 also helps hold the assembly upright.

When the lava tube has risen well above sea level, magma can be directed into molds and otherwise processed in various barges surrounding the magma chimney island.

Figure 10:
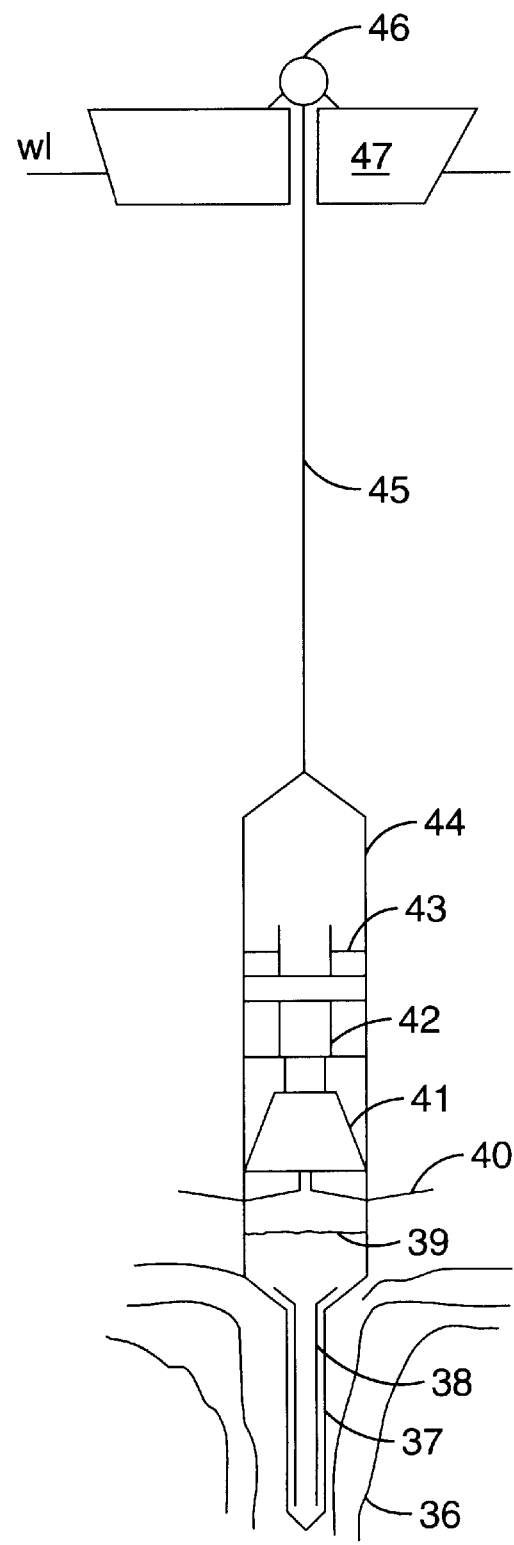
FIG. 10 shows in cross-section an underwater generator according to the invention.

FIG. 10 shows in cross-section, an underwater generator system. Volcanic magma is flowing from an underwater vent 36. A coaxial boiler tube 37 is inserted into the magma. A propeller 38, driven by the turbine 41 aids circulation of the boiler water. Just above the steam chest 39 is a collar 40 to limit penetration of the probe. The steam turbine 41 drives the generator 42 and the feed water trap 43 collects the condensate from the condenser 44. A cable 45 and winch 46 on vessel 47 position the underwater generator. Power cables (not shown) could go ashore underwater.

Figure 11:
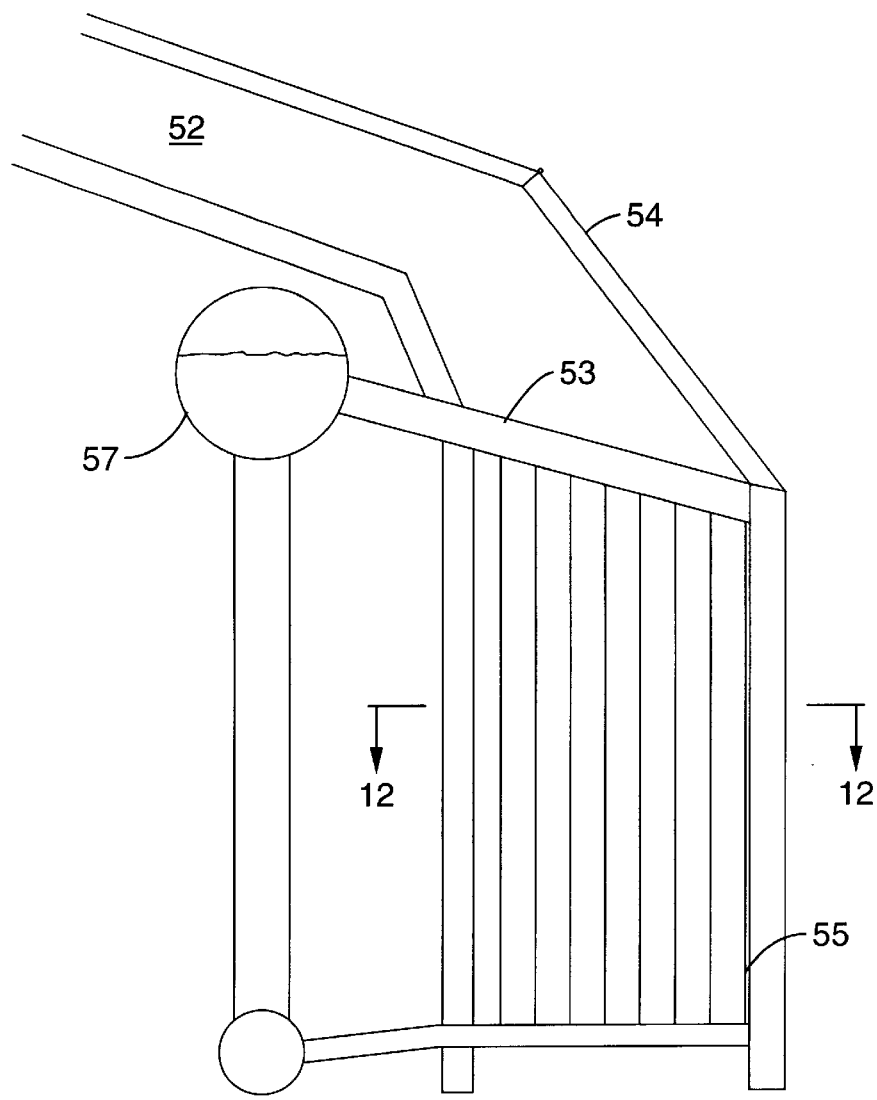
FIG. 11 shows views of a flowing volcanic magma heated vertical boiler according to the invention.
Figure 12:
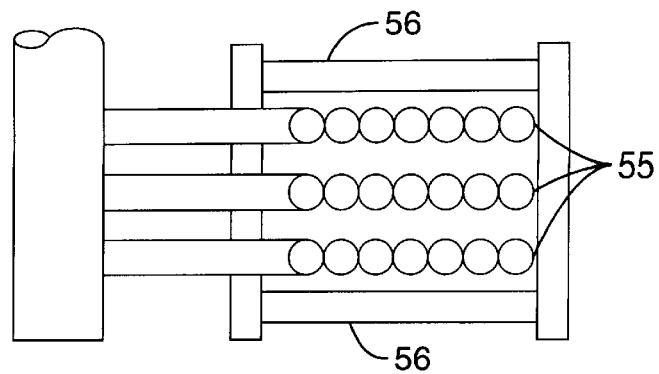
FIG. 12 is a cross-section of the flowing volcanic magma heated vertical boiler shown in FIG. 11 taken through line 12—12.

FIG. 11 and FIG. 12 show a flowing volcanic magma heated vertical boiler that could be especially efficient where a good vertical drop is possible in the magma flow. Flowing volcanic magma enters at lava tube 52 and flows across and down through a grate of boiler header tubes 53 that are slightly larger in diameter and therefore closer together than the vertical boiler tubes 55. Solids that cannot pass the grate 53 as well as excess magma flow will be forced through gate 54. Boiler sides 56 can move in or out to help control flow and to allow access to the tubes. Circulation of water and steam to the steam chest 57 and heat transfer will be enhanced because this is a counter flow heat exchanger.

Accordingly, it can be seen that the present invention is directed to harnessing and using flowing volcanic magma in ways that have not been used before. Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of manufacturing a building material, comprising:

directing molten volcanic magma from an underwater volcanic magma vent to a level above sea level via a tube formed from the magma;

directing the molten volcanic magma into a mold located on a floating barge;

cooling the magma in the mold to form a building material; and removing the building material from the mold.

* * * * *